Nov. 7, 1967  E. A. OLSEN  3,350,770
METHOD OF MANUFACTURING CHAIN SAW CUTTER BARS
Original Filed July 16, 1962
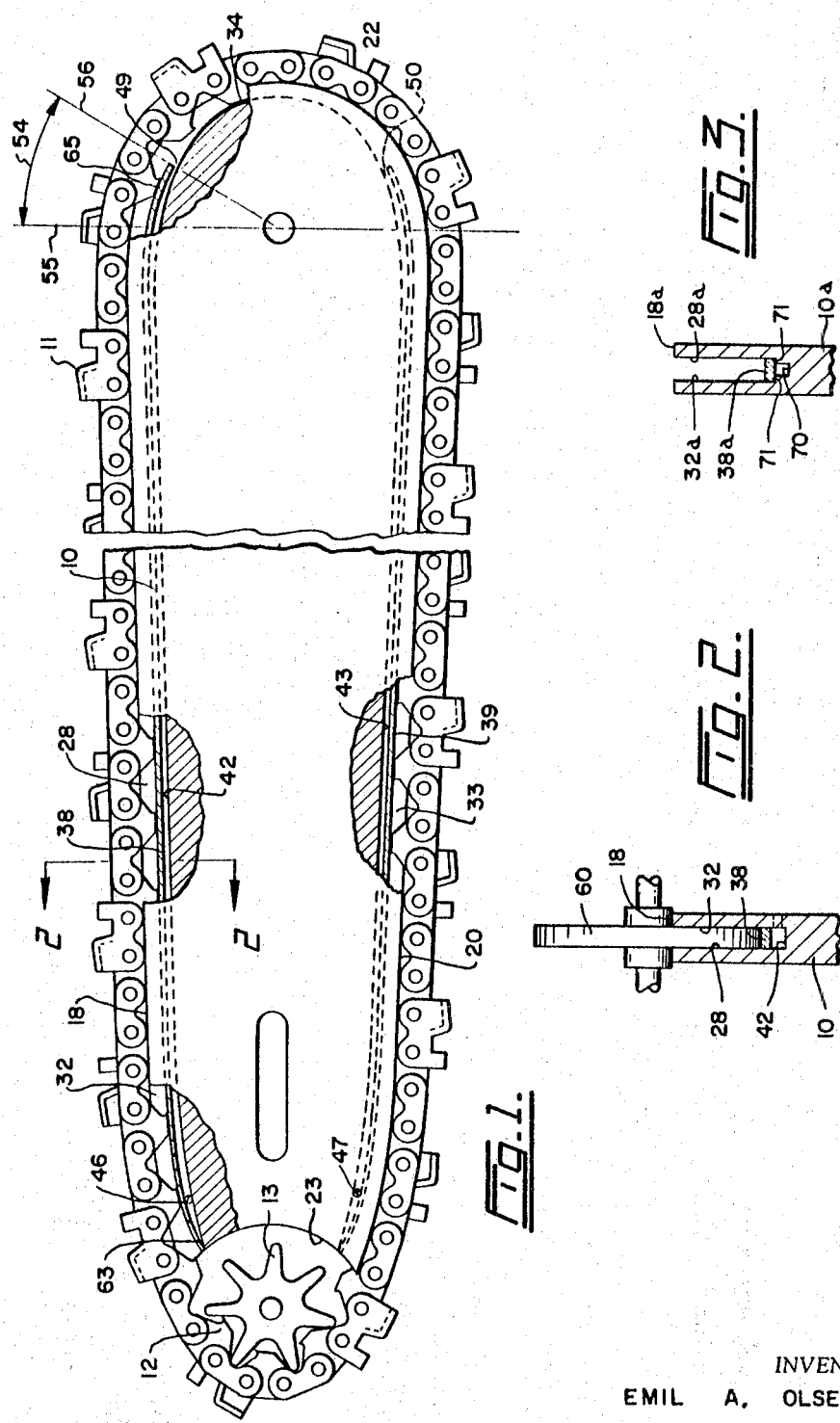
INVENTOR.
EMIL A. OLSEN
BY
Fetherstonhaugh & Co.
ATTORNEYS

3,350,770
METHOD OF MANUFACTURING CHAIN SAW CUTTER BARS
Emil A. Olsen, 7510 Aubrey St., North Burnaby, British Columbia, Canada
Original application July 16, 1962, Ser. No. 210,003, now Patent No. 3,185,191, dated May 25, 1965. Divided and this application Apr. 6, 1965, Ser. No. 445,908
11 Claims. (Cl. 29—475)

This is a division of application Ser. No. 210,003, filed July 16, 1962, now Patent No. 3,185,191.

This invention relates to a method of manufacturing an improved chain saw cutter bar.

The proper lubrication of saw chains as they are driven around cutter bars has been a great problem in the industry. Oil has been forced into the peripheral grooves of cutter bars by hand, by manual injectors and by pressure systems operated by the chain saw motors. However, as the chain speed increased in recent years, the oiling problem has increased. The great difficulty is to get oil into the grooves near and around the curved outer ends of the bars. The oil is usually injected into the upper peripheral groove of the bar during operation, and the lugs of the saw chain carry this oil towards the outer or curved end of the bar. Unfortunately, centrifugal force throws a great deal of this oil outwardly of the chain so that there is very little or no oil available for use as the chain rounds the last part of the cutter bar and moves through the lower peripheral groove of the bar where lubricant is greatly needed because of the pressure and friction heat generated during the cutting operation.

Attempts have been made to provide oil passages in the bars extending from their inner ends to near their outer ends, said passages opening into the peripheral grooves extending along the longitudinal edges of the bar. This has been helpful to some extent, but the problem of oil being thrown outwardly near and at the outer end of the bar by centrifugal force remains. In addition to this, the longitudinal oil passages could be provided in a practical manner only in laminated bars. However, laminated bars have proven so unsuccessful in the industry that they have been practically abandoned and most bars on the market today are solid bars. It would be a long, difficult and time-consuming job to drill internal oil passages extending the length of solid bars.

The poor lubrication of saw chains as they move around at the curved outer ends of the cutter bars and along the lower longitudinal edges thereof results in unnecessary wear, heat problems, and the wastage of a high percentage of the power of the saw engine. One of the main purposes of the present invention is the provision of means for providing adequate oiling at and near the curved outer ends of cutter bars. This results in a drastic reduction of wear, the generation of very little frictional heat, and in making available more of the power of the engine for cutting purposes.

Solid cutter bars are made of relatively heavy steel plate with a groove milled in its two longitudinal edges and its curved outer end. The plate must be initially in a soft condition for the milling operation, and after this operation, it is heat treated along its edges to harden said edges so that they will stand up to the wear and tear of a saw chain being moved around the bar with the driving lugs thereof in the peripheral groove.

The method according to the present invention utilizes this heat treatment in order to help produce oil passages in the bar extending substantially from end to end thereof. Thus, the provision of heat does not in itself increase the cost of producing the bars.

It is preferable to provide an oil passage beneath the peripheral groove extending along each longitudinal edge of the bar but it will be understood that only one oil passage may be provided, if desired. In the latter case, the cutter bar could not be turned over so that either longitudinal edge thereof could be located along the section of the saw chain during the actual cutting. For the sake of convenience, the improved cutter bar and the method of manufacturing it will be described with two oil passages in it.

The present method of manufacturing a chain saw cutter bar from a solid bar plate comprises forming a continuous peripheral groove in the longitudinal edges and curved outer end edge of the bar plate, and making the groove in each longitudinal edge deeper than necessary for the driving lugs of a saw chain when mounted on the bar plate in the standard manner. Each deepened groove extends from near the inner end of the plate to the curved end thereof. A wall is secured in each deepened groove extending lengthwise thereof and spaced from the groove bottom to form an oil passage within the bar plate along said bottom. The preferred way of doing this is to apply solder, such as silver solder, to each wall before it is inserted in a groove, although the wall may be secured in place by other means, such as electrical or acetylene welding, or the like. The wall is made a tight fit so that it has to be moved downwardly in its groove under pressure. An entrance is formed for each oil passage through the plate at the end thereof near the inner end of said plate, the other end of said passage opening into the peripheral groove near the curved end of the bar plate and preferably in said curved end. The edges of the bar plate are heat treated in the usual manner to harden said edges, and this at the same time secures said walls in their respective grooves by bonding the solder. Thus, in a very simple and effective manner, an oil passage is formed under each groove extending along a longitudinal edge of the cutter bar. The normal heat treatment of the bar edges results in the walls that form the oil passages being firmly secured in place.

An important feature of this invention is the fact that each oil passage preferably opens into the peripheral groove at the curved end of the cutter bar a few degrees around said curved end from a longitudinal edge of the bar. As a result of this, the driving lugs of the saw chain come into contact with the oil after they have moved a short distance around the curved end of the bar. This practically eliminates any oil from being thrown outwardly from the bar end under the action of centrifugal force, so that the oil stays with said lugs all the way around the bar end and into the outer part of the peripheral groove extending along the lower longitudinal edge of the bar where the chain usually cuts through the wood. The outlet of each oil passage may be located at different places around the curved end of the bar, but it has been found that very satisfactory results are attained if said outlet is located about 20° around the curved end from the longitudinal edge of the bar.

When a cutter bar is made in accordance with this invention, the outlet of each oil passage opens in the direction of movement of the chain so that as the driving lugs of the latter move over this outlet, they tend to create suction at the outlet to keep it clean. This prevents sawdust and dirt from being pounded into the outlet, which will be the case if the outlet opened out in a direction substantially normal to the direction of movement of the chain. When an end of the wall in the groove extends part way around the curved outer end of the bar and terminates on the curved outer end, the outlet is directed substantially tangentially of the groove bottom and substantially in the direction of movement of the chain saw lugs. With this arrangement, the oil emerges from the oil passage in the direction of movement of the chain saw lugs, and at a point where it will not be thrown outwardly under the action of centrifugal force.

An example of a cutter bar made in accordance with this method is illustrated in the accompanying drawings, in which, FIGURE 1 is an elevation of the cutter bar with a saw chain extending around it, with parts of the bar broken away, and showing the driving sprocket of a chain saw;

FIGURE 2 is an enlarged vertical section taken substantially on the line 2—2 of FIGURE 1, showing one form of mechanism for inserting a wall in a peripheral groove; and FIGURE 3 is a view similar to FIGURE 2 illustrating an alternative form of groove and oil passage arrangement.

Referring to FIGURES 1 ad 2 of the drawings, 10 is a chain saw cutter bar, 11 is a standard saw chain having driving lugs 12 projecting inwardly therefrom, and 13 represents the driving sprocket of a chain saw, not shown. Cutter bar 10 is made of an elongated solid bar plate having longitudinal side edges 18 and 20, and a curved edge 22 extending around the curved outer end of said bar between the longitudinal edges. The bar is formed with the usual inner end 23.

A continuous peripheral groove 28 is formed in edges 18, 22 and 20 of bar 10 and opens outwardly from said edges, this groove being adapted to receive the driving lugs 12 of the chain 11 in the usual manner. This chain extends around bar 10 with its driving lugs 12 in groove 28, and around driving sproket 13 which moves said chain around the cutter bar.

Groove 28 is formed with sections 32 and 33 along longitudinal edges 18 and 20, and with an intermediate section 34 along the curved edge 22. During the formation of groove 28, the sections 32 and 33 thereof are made deeper than necessary for the saw chain lugs 12, said deepened sections extending from near the inner end 23 of the cutter bar to the curved outer end thereof. Groove section 34 is mainly just deep enough to accommodate chain lugs 12 in the usual manner.

Longitudinal walls 38 and 39 are secured in the deepened grooves of sections 32 and 33, respectively, and spaced above the bottoms of the grooves in said sections to form oil passages 42 and 43. Entrances 46 and 47 are formed through the bar plate to oil passages 42 and 43 at the ends thereof near the inner end 23 of the bar. The other ends of said passages open into the peripheral groove at 49 and 50 at the curved end of the plate. Passage outlets 49 and 50 are preferably a few degrees around the curved end of the bar from the adjacent longitudinal edges 18 and 20, as shown, although they can be located in groove sections 32 and 33 at or near said curved end. It has been found that good results are attained if these outlets are approximately 20° around the curved end. This location of outlet 49 is indicated by angle 54 between vertical line 55 extending substantially through the centre of curvature of the outer end of bar 10 and line 56 extending from said centre outwardly through outlet 49.

When bar 10 is mounted on a chain saw, not shown, chain 11 is placed around said bar with lugs 12 in peripheral groove 28, said chain also extending around drive sprocket 13. Oil is injected into entrances 46 and 47 in any desired manner. This may be done by hand, or it may be done manually by means of a pressure gun, or said entrances may be connected to an oiling system operated by the motor of the chain saw. With the bar set up as shown in FIGURE 1, oil passage 42 is usually the only one used, in which case oil is injected into this passage only. The passage directs the oil longitudinally of the bar and allows it to flow out of outlet 49 which is part way around the curved outer end of said bar. The outlet is far enough around that the oil as it is picked up by the lugs 12 of the chain is not thrown outwardly from the end of the bar by centrifugal force so that said lugs carry the oil around to the lower portion of the curve where oil is so badly needed. These lugs will also carry some oil along the lower section 33 of the peripheral groove 28. When the bar is turned over, oil is injected through entrance 47 instead of entrance 46 and travels along passage 43 to outlet 50 with the same results as those attained with oil flowing out of outlet 49 as described. Thus, oil is made available where it is most needed around bar 10, that is, around its curved outer end. This greatly reduces wear and tear on the cutter bar and on the chain at the outer end of the former, and it makes an increased percentage of the power of the chain saw available for the cutting action.

It will be noted from FIGURE 1 that outlets 49 and 50 open outwardly along the bottom of the bar groove and in the direction of movement of the saw chain. Walls 38 and 39 terminate abruptly so that the chain lugs as they move over and off the ends of these walls may pass over the spaces into which outlets 49 and 50 open, creating suction in these spaces to help keep the outlets clear of sawdust and other foreign matter.

The method of producing cutter bar 10 is very important. Wall 38 is made just large enough to fit tightly in section 32 of peripheral groove 28. It is preferable to coat this wall with silver solder before it is placed in the groove. Then it is placed in groove section 32 and pressed downwardly therein in any convenient manner, such as by means of a pressure wheel 60, see FIGURE 2, which is driven in any suitable manner. The diameter of this pressure wheel is such that it moves wall 38 downwardly in the groove only to a point spaced above the bottom thereof so that passage 42 is left beneath said wall. The inner end of wall 38 may be pressed downwardly as indicated at 63 in order to close off the inner end of passage 42 just beyond entrance 46 thereof. The outer or opposite end of wall 38 is preferably curved downwardly at 65 so that it extends part way around the curved end of the bar 10. The curve of wall end 65 is preferably the same as that of the bottom of groove section 34 around the outer end of the bar so that lugs 12 of chain 11 move without difficulty in either direction between groove sections 32 and 34. Wall 39 is inserted in groove section 33 in the same manner as wall 38. Once the various elements of bar 10 are assembled, the longitudinal edges 18 and 20, and curved edge 22 are subjected to the usual heat treatment in order to harden said edges so that they will stand up to the action of chain 11 moving along these edges. At the same time this application of heat melts the solder on walls 38 and 39 so that said walls are firmly secured in their proper positions within peripheral groove 28. Thus, the one necessary heat treating operation also firmly secures the walls which form the oil passages in bar 10 in their proper positions.

The above-described method of securing walls 38 and 39 in position utilizes the standard heat treatment of the cutter bar. However, it will be understood that these walls may be secured in place by electrical or acetylene welding or the like.

FIGURE 3 illustrates an alternative way of forming the oil passages in cutter bar 10a, one passage only being shown. Section 32a of main groove 28a is made only a little deeper than necessary for the saw chain lugs and a narrow groove 70 is out in the bottom of groove 28a, forming shoulders 71 at the sides thereof. Wall 38a is pressed down in groove 28a against said shoulders 71 to close the top of groove 70, making the latter an oil passage. Wall 38a is preferably secured in position by solder, as described above, but it may be welded or otherwise secured in place.

What I claim as my invention is:

1. The method of manufacturing a chain saw cutter bar from a solid bar plate having an inner end, two longitudinal edges and a curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in at least one of the longitudinal edges deeper than necessary for the chain lugs, said deepened groove extending from near the inner end of the plate to near the curved end thereof, fitting a wall in the deepened groove spaced from the groove bottom to form an oil passage within the bar plate, and forming an entrance through the plate to the oil passage at the end thereof near the inner end of said plate, the other end of said passage opening into the peripheral groove near the curved end of the plate.

2. The method of manufacturing a chain saw cutter bar from a solid plate having an inner end, two longitudinal edges and a curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in at least one of the longitudinal edges deeper than necessary for the chain lugs, said deepened groove extending from near the inner end of the plate of the curved end thereof, fitting a wall in the deepened groove spaced from the groove bottom to form an oil passage within the bar plate, and forming an entrance through the plate to the oil passage at the end thereof near the inner end of said plate, the other end of said passage opening into the peripheral groove a few degrees around the curved end of the plate.

3. The method of manufacturing a chain saw cutter bar from solid bar plate having an inner end, two longitudinal edges and curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in each longitudinal edge deeper than necessary for the chain lugs, each deepened groove extending from near the inner end of the plate to near the curved end thereof, fitting a wall in each deepened groove spaced from the groove bottom to form an oil passage within the bar plate, and forming an entrance through the plate to each oil passage at the end thereof near the inner end of said plate, the other end of each of said passages opening into the peripheral groove near the curved end of the plate.

4. The method of manufacturing a chain saw cutter bar from a solid bar plate having an inner end, two longitudinal edges and a curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in each longitudinal edge deeper than necessary for the chain lugs, each deepened groove extending from near the inner end of the plate to near the curved end thereof, cutting a narrow groove in the bottom of each deepened groove to form shoulders on opposite sides of said narrow groove, fitting a wall in each deepened groove against said shoulders to form an oil passage within the bar plate, and forming an entrance through the plate to each oil passage at the end thereof near the inner end of said plate, the other end of each of said passages opening into the peripheral groove near the curved end of the plate.

5. The method of manufacturing a chain saw cutter bar from a solid bar plate having an inner end, two longitudinal edges and a curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in at least one of the longitudinal edges deeper than necessary for the chain lugs, said deepened groove extending from near the inner end of the plate to near the curved end thereof, coating a wall for the deepened groove with solder and inserting said wall therein and moving the wall to near but above the bottom of the deepened groove to form an oil passage along said bottom, heat treating said edges of the bar plate to harden the edges and secure said wall in its groove, and forming an entrance through the plate to the oil passage at the end thereof near the inner end of said plate, the other end of said oil passage opening into the peripheral groove near the curved end of the plate.

6. The method of manufacturing a chain saw cutter bar from a solid bar plate having an inner end, two longitudinal edges and a curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in at least one of the longitudinal edges deeper than necessary for the chain lugs, said deepened groove extending from near the inner end of the plate to near the curved end thereof, coating a wall for the deepened groove with solder and inserting said wall therein and moving the wall to near but above the bottom of the deepened groove to form an oil passage along said bottom, heat treating said edges of the bar plate to harden the edges and secure said wall in its groove, and forming an entrance through the plate to the oil passage at the end thereof near the inner end of said plate, the other end of said passage opening into the peripheral groove a few degrees around the curved end of the plate.

7. The method of manufacturing a chain saw cutter bar from a solid bar plate having an inner end, two longitudinal edges and a curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in each longitudinal edge deeper than necessary for the chain lugs, each deepened groove extending from near the inner end of the plate to the curved end thereof, coating walls for the deepened grooves with solder and inserting said walls therein and moving the walls to near but above the bottoms of the respective grooves to form oil passages along said bottoms, heat treating said edges of the bar plate to harden the edges and secure said walls in their respective grooves, and forming an entrance through the plate to each oil passage at the end thereof near the inner end of said plate, the other end of each of said passages opening into the peripheral groove a few degrees around the curved end of the plate.

8. The method of manufacturing a chain saw cutter bar from a solid bar plate having an inner end, two longitudinal edges and a curved outer end with a curved edge extending between the longitudinal edges, which comprises forming a continuous peripheral groove in said edges and opening outwardly therefrom adapted to receive driving lugs of a saw chain when mounted on the bar plate in the standard manner, making the groove in at least one longitudinal edge deeper than necessary for the chain lugs, said depened groove extending from near the inner end of the plate to near the curved end thereof, cutting a narrow groove in the bottom of said deepened groove to form shoulders on opposite sides of said narrow groove, fitting a wall in the deepened groove against said shoulders to form an oil passage within the bar plate, and forming an entrance through the plate to said oil passage at the end thereof near the inner end of said plate, the other end of said oil passage opening into the peripheral groove near the curved end of the plate.

9. The method of manufacturing a chain saw cutter bar from a solid bar plate having an inner end, two longitudinal edges and a curved outer end with a curved end extending between the longitudinal edges, which comprises forming a continuous peripheral groove in said edges and opening outwardly therefrom adapted to receive driving lugs of a saw chain when mounted on the bar plate in the standard manner, making the groove in at least one longitudinal edge deeper than necessary for the chain lugs, said deepened groove extending from near the inner end of the plate to near the curved end thereof, cutting a narrow groove in the bottom of said deepened groove to form shoulders on opposite sides of said narrow groove, coating walls for the deepened groove with solder and inserting said wall therein and moving the wall against said shoulders to cover the narrow groove and thereby form an oil passage, heat treating said edges of the bar plate to harden the edges and secure said wall in its deepened groove, and forming an entrance through the plate to said oil passage at the end thereof near the inner end of said plate, the other end of said oil passage opening into the peripheral groove near the curved end of the plate.

10. The method of manufacturing a chain saw cutter bar from a solid bar plate having an inner end, two longitudinal edges and a curved outer end with a curved end extending between the longitudinal edges, which comprises forming a continuous peripheral groove in said edges and opening outwardly therefrom adapted to receive driving lugs of a saw chain when mounted on the bar plate in the standard manner, making the groove in at least one longitudinal edge deeper than necessary for the chain lugs, said deepened groove extending from near the inner end of the plate to near the curved end thereof, cutting a narrow groove in the bottom of said deepened groove to form shoulders on opposite sides of said narrow groove, fitting a wall in the deepened groove against said shoulders to form an oil passage within the bar plate, and forming an entrance through the plate to said oil passage at the end thereof near the inner end of said plate, the other end of said oil passage opening into the peripheral groove a few degrees around the curved end of the plate.

11. The method of manufacturing a chain saw cutter bar from a solid bar plate having an inner end, two longitudinal edges and a curved outer end with a curved end extending between the longitudinal edges, which comprises forming a continuous peripheral groove in said edges and opening outwardly therefrom adapted to receive driving lugs of a saw chain when mounted on the bar plate in the standard manner, making the groove in at least one longitudinal edge deeper than necessary for the chain lugs, said deepened groove extending from near the inner end of the plate to near the curved end thereof, cutting a narrow groove in the bottom of said deepened groove to form shoulders on opposite sides of said narrow groove, coating walls for the deepened groove with solder and inserting said wall therein and moving the wall against said shoulders to cover the narrow groove and thereby form an oil passage, heat treating said edges of the bar plate to harden the edges and secure said wall in its deepened groove, and forming an entrance through the plate to said oil passage at the end thereof near the inner end of said plate, the other end of said oil passage opening into the peripheral groove a few degrees around the curved end of the plate.

References Cited

UNITED STATES PATENTS

| 2,765,823 | 10/1956 | Kneifl | 143—32.1 |
| 2,913,020 | 11/1959 | Nielsen | 143—32.1 |
| 3,010,538 | 11/1961 | Strunk | 143—32.1 X |

FOREIGN PATENTS

| 29,876 | 1897 | Great Britain. |
| 355,631 | 8/1931 | Great Britain. |

CHARLIE T. MOON, *Primary Examiner.*